United States Patent
Nanba et al.

(10) Patent No.: US 9,095,747 B2
(45) Date of Patent: *Aug. 4, 2015

(54) GOLF BALL COMPOSITION AND GOLF BALL

(71) Applicant: Bridgestone Sports Co., Ltd., Minato-ku, Tokyo (JP)

(72) Inventors: Atsushi Nanba, Chichibushi (JP); Takanori Tago, Chichibushi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 285 days.

This patent is subject to a terminal disclaimer.

(21) Appl. No.: 13/728,485

(22) Filed: Dec. 27, 2012

(65) Prior Publication Data

US 2014/0187350 A1 Jul. 3, 2014

(51) Int. Cl.
| | |
|---|---|
| *A63B 37/00* | (2006.01) |
| *A63B 37/12* | (2006.01) |
| *C08L 23/06* | (2006.01) |
| *C08L 23/08* | (2006.01) |

(52) U.S. Cl.
CPC ......... *A63B 37/0039* (2013.01); *A63B 37/0024* (2013.01); *A63B 37/0036* (2013.01); *A63B 37/0048* (2013.01); *A63B 37/0074* (2013.01); *A63B 37/0075* (2013.01); *C08L 23/0869* (2013.01); *C08L 23/0876* (2013.01); *A63B 37/0076* (2013.01)

(58) Field of Classification Search
None
See application file for complete search history.

(56) References Cited

U.S. PATENT DOCUMENTS

| | | | | |
|---|---|---|---|---|
| 4,567,219 | A | * | 1/1986 | Tominaga et al. ............. 524/413 |
| 6,303,704 | B1 | * | 10/2001 | Nesbitt ....................... 525/333.8 |
| 6,608,127 | B1 | * | 8/2003 | Kato et al. .................... 524/272 |
| 6,855,075 | B2 | | 2/2005 | Ichikawa et al. |
| 7,241,232 | B2 | | 7/2007 | Sullivan et al. |
| 8,362,149 | B2 | | 1/2013 | Egashira et al. |
| 2014/0187349 | A1 | * | 7/2014 | Nanba et al. .................. 473/372 |

FOREIGN PATENT DOCUMENTS

| | | | |
|---|---|---|---|
| JP | 61-036347 | A | 2/1986 |
| JP | 10-66740 | A | 3/1998 |
| JP | 2002-331048 | A | 11/2002 |
| JP | 2003206376 | * | 7/2003 |
| JP | 2010-51800 | A | 3/2010 |

OTHER PUBLICATIONS

Human Farida Technology data sheet for 2,5-bis(t-butylperoxy)-2,5-dimethylhexane; no date.*
Dow data sheet for DOWLEX 2035; Jul. 2011.*
Dow data sheet for DOWLEX 2552E; Jan. 2009.*

* cited by examiner

*Primary Examiner* — David Buttner
(74) *Attorney, Agent, or Firm* — Sughrue Mion, PLLC

(57) ABSTRACT

The invention provides a golf ball composition containing an ionomer resin composition of: (A) one or more ionomer selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer; (B) a polyethylene; and (C) an organic peroxide.

11 Claims, No Drawings

GOLF BALL COMPOSITION AND GOLF BALL

BACKGROUND OF THE INVENTION

The present invention relates to a golf ball composition which is well-suited for use as, in particular, a golf ball cover material. More specifically, the invention relates to a golf ball composition which is capable of greatly improving the durability of the golf ball as a whole while maintaining the initial velocity of the ball.

In recent years, ionomer resins have been widely used in golf ball materials. Ionomer resins are ionic copolymers which are composed of an olefin such as ethylene and an unsaturated carboxylic acid such as acrylic acid, methacrylic acid or maleic acid, and in which the acidic groups are partially neutralized with metal ions such as sodium, lithium, zinc or magnesium. These resins have outstanding qualities in terms of durability, resilience, scuff resistance and the like.

Ionomer resins are currently the predominant type of base resin used in golf ball cover materials. However, because users are constantly on the lookout for golf balls which are endowed with softness and a high rebound, and thus exhibit excellent flight properties, and which also have an excellent durability, various improvements are being carried out on ionomer resins.

Efforts to modify ionomer materials by mixing another thermoplastic resin or thermoplastic elastomer into an ionomer material include, for example, the polymer composition disclosed in JP-B 4-46296, and the method of improving the scuff resistance and cut resistance of game balls having an ionomer cover disclosed in JP-A 10-66740.

In order to provide a cover having a good moldability and excellent resilience, durability and feel, JP-A 2002-331048 discloses a golf ball cover-forming composition which is formulated from an ionomer resin, a thermoplastic urethane material, and a rubbery elastomer composition formulated from, as the essential ingredient, a rubbery elastomer.

In addition, JP-A 2010-51800 describes an ionomer resin composition obtained by compounding a material that is curable by exposure to sunlight, x-rays, ultraviolet light (UV), an electron beam (EB), a plasma arc or the like (UV/EB curable material) together with a thermoplastic resin, in the presence of a peroxide and without carrying out exposure to sunlight, x-rays, ultraviolet light, an electron beam, a plasma arc or the like, then melt-mixing the resulting compound under applied heat with an ionomer resin. This art enables the suppression of layer separation among the golf ball layers, making it possible to obtain a high-performance golf ball having an excellent softness, durability and scuff resistance without a loss of rebound.

However, there exists a desire for golf ball compositions composed primarily of an ionomer resin, which compositions exhibit even further improvements, particularly increased resilience and durability.

SUMMARY OF THE INVENTION

It is therefore an object of the invention to provide a golf ball composition composed primarily of an ionomer resin, which composition exhibits further increases in resilience and durability.

As a result of extensive investigations, the inventors have discovered that, in an ionomer resin composition obtained by compounding:
(A) one or more ionomer selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer;
(B) a polyethylene; and
(C) an organic peroxide,
by setting the melt flow rate of component B in a specific range, setting the compounding ratio of component A to component B, expressed as the weight ratio A/B, to between 95/5 and 50/50, setting the amount of component C included per 100 parts by weight of the total amount of the resin components to at least 0.001 part by weight and not more than 3 parts by weight, and setting the compounding ratio of component B to component C, expressed as the weight ratio C/B, in the range of from $0.2 \times 10^{-2}$ to $6.0 \times 10^{-2}$, the durability can be increased while maintaining a good resilience.

By mixing (B) a polyethylene and (C) an organic peroxide under applied heat into (A) one or more ionomer selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer, the formation of ion clusters within the composition is suppressed and ionomer molecules are kept from aggregating, thus making the ionomer and the polyethylene more readily compatible. In turn, when this composition is used in a golf ball material, the rebound of the ball and, in particular, the durability of the ball to cracking can be improved.

Accordingly, the invention provides the following golf ball composition and golf ball.

[1] A golf ball composition comprising an ionomer resin composition which is comprised of:
(A) one or more ionomer selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer;
(B) a polyethylene; and
(C) an organic peroxide,
wherein component B has a melt flow rate, as measured in accordance with JIS K6760 at a test temperature of 190° C. and a test load of 21 N (2.16 kgf), of at least 5 g/10 min; component A and component B have a compounding ratio therebetween, expressed as the weight ratio A/B, of between 95/5 and 50/50; component C is included in an amount, per 100 parts by weight of the total amount of resin components, of at least 0.001 part by weight and not more than 3 parts by weight; and component B and component C have a compounding ratio therebetween, expressed as the weight ratio C/B, in the range of from $0.2 \times 10^{-2}$ to $6.0 \times 10^{-2}$.

[2] The golf ball composition of [1], wherein component C has a one-minute half life temperature of at least 140° C.

[3] The golf ball composition of [1], wherein the metal neutralization product of component A in the ionomer resin composition contains cations which come from a cation source selected from the group consisting of zinc compounds, sodium compounds and magnesium compounds.

[4] The golf ball composition of [1] which has a melt flow rate, as measured in accordance with JIS K6760 at a test temperature of 190° C. and a test load of 21 N (2.16 kgf), of at least 0.1 g/10 min.

[5] A golf ball obtained by using a molding of the golf ball material of [1] as a structural component of the ball.

[6] A golf ball obtained by using the golf ball material of [1] as a cover material or an intermediate layer material in a two-piece solid golf ball having a core and a cover encasing the core, or in a multi-piece solid golf ball having a core of at least one layer, at least one intermediate layer encasing the core and a cover of at least one layer encasing the intermediate layer.

DETAILED DESCRIPTION OF THE INVENTION

The invention is described more fully below.

The golf ball composition of the invention includes an ionomer resin composition which is made up of: (A) one or more ionomer selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer; (B) a polyethylene; and (C) an organic peroxide.

Component A is described below.

The ionomer of component A includes one, two or more of any of the following: as component (A1), an olefin-unsaturated carboxylic acid random copolymer and/or an olefin-unsaturated carboxylic acid-unsaturated carboxylic acid ester random copolymer; and, as component (A2), a metal ion neutralization product of an olefin-unsaturated carboxylic acid random copolymer and/or a metal ion neutralization product of an olefin-unsaturated carboxylic acid-unsaturated carboxylic acid ester random copolymer.

Here, the olefin in component A is one in which the number of carbons is generally at least 2 but not more than 8, and preferably not more than 6. Illustrative examples include ethylene, propylene, butene, pentene, hexene, heptene and octene. Ethylene is especially preferred.

Illustrative examples of the unsaturated carboxylic acid in component A include acrylic acid, methacrylic acid, maleic acid and fumaric acid. Acrylic acid and methacrylic acid are especially preferred.

The unsaturated carboxylic acid ester in component A is preferably a lower alkyl ester of any of the above unsaturated carboxylic acids. Illustrative examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, i-butyl acrylate) is especially preferred.

The random copolymers serving as component A1 may be obtained by random copolymerizing the above ingredients according to a known method. Here, it is recommended that the content of unsaturated carboxylic acid (acid content) included in the random copolymer be preferably at least 2 wt %, more preferably at least 6 wt %, and even more preferably at least 8 wt %, but preferably not more than 25 wt %, more preferably not more than 20 wt %, and even more preferably not more than 15 wt %. If the content is low, the resilience may decline, whereas if it is high, the processability may decline.

The random copolymer neutralization products serving as component A2 may be obtained by neutralizing some of the acid groups on the above random copolymer with metal ions. Here, specific examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. No particular limitation is imposed on the degree of neutralization of the random copolymer by these metal ions.

Such neutralization products may be obtained by a known method. For example, a compound such as a formate, acetate, nitrate, carbonate, bicarbonate, oxide, hydroxide or alkoxide of these metal ions may be used to introduce the metal ions onto the random copolymer. Also, of the metal ion neutralization products serving as component A2, it is especially desirable for cations therein to come from a cation source selected from the group consisting of zinc compounds, sodium compounds and magnesium compounds.

Illustrative examples of the random copolymers of component A1 include Nucrel AN4311, Nucrel AN4318 and Nucrel 1560 (all available from DuPont-Mitsui Polychemicals Co., Ltd.). Illustrative examples of the metal ion neutralization products of random copolymers of component A2 include Himilan 1554, Himilan 1557, Himilan 1601, Himilan 1605, Himilan 1706, Himilan 1855 and Himilan 1856 (all available from DuPont-Mitsui Polychemicals Co., Ltd.), and Surlyn 6910, Surlyn 7930 and Surlyn 8320 (all from E.I. DuPont de Nemours & Co.).

The random copolymers serving as component A1 and/or the metal ion neutralization products of random copolymers serving as component A2 may be used individually, or both components may be compounded and used together. In cases where both components are compounded and used together, the compounding ratio is not subject to any particular limitation.

Next, to achieve the desired effects of the invention, it is desirable for the polyethylene serving as component B to be a polyethylene having high flow properties. Specifically, with regard to the physical properties of the polyethylene, it is preferable for the polyethylene to have a specific gravity in the range of 0.91 to 0.97. It is also preferable for the polyethylene to have a Shore D material hardness in the range of 40 to 60. Moreover, it is preferable for the polyethylene to have a softening temperature, as determined in accordance with JIS K2207, in the range of 90 to 150° C. (or, in accordance with JIS K7206, in the range of 80 to 100° C.). A commercial product which satisfies these properties may be used as the polyethylene serving as component B. Examples of such products include the product available under the trade name "UBE Polyethylene J1019" from Ube-Maruzen Polyethylene and the series of products available under the trade name "Sanwax" from Sanyo Chemical Industries, Ltd.

The polyethylene serving as component B has a melt flow rate, as measured in accordance with JIS K6760 at a test temperature of 190° C. and a test load of 21 N (2.16 kgf), which must be at least 5 g/10 min, and is preferably at least 6 g/10 min, more preferably at least 7 g/10 min, and even more preferably at least 8 g/10 min. At a high melt flow rate, the flow properties are good, which enables injection molding to be efficiently carried out.

The compounding ratio of component A to component B, expressed as the weight ratio A/B, must be between 95/5 and 50/50, and is preferably between 95/5 and 55/45, and more preferably between 95/5 and 65/35. Outside this range, the durability worsens. This is presumably due to a poorly compatible state between the ionomer and the polyethylene.

Next, no particular limitation is imposed on the organic peroxide serving as component C, although use can be made of various organic peroxides that are commonly used as golf ball materials. The use of an organic peroxide having a one-minute half-life temperature of at least 140° C. is especially preferred.

With regard to the peroxide half-life temperature, use is made of an organic peroxide having a one-minute half-life temperature of preferably at least 140° C., more preferably at least 150° C., and even more preferably at least 160° C. If this half-life temperature is too low, peroxide crosslinking between or within ionomer molecules and peroxide crosslinking between or within polyethylene molecules will proceed abruptly with mixing, making it difficult to obtain a uniformly blended state between the ionomer and the polyethylene, which may lead to a decline in the durability of the golf ball.

Use may be made of one or more organic peroxide selected from among, for example, dicumyl peroxide (one-minute half-life temperature, 175° C.), di-t-butyl peroxide (one-minute half-life temperature, 186° C.), 2,5-dimethyl-2,5-di(t-butyl-peroxy)hexyne-3 (one-minute half-life temperature, 194° C.), n-butyl-4,4-di(t-butylperoxy)valerate (one-minute half-life temperature, 173° C.), di(2-t-butylperoxyisopropyl)benzene (one-minute half-life temperature, 175° C.), di-t-hexyl peroxide (one-minute half-life temperature, 177° C.) and p-menthane hydroperoxide (one-minute half-life temperature, 200° C.) Products available from NOF Corporation under, for example, the trade names "Perbutyl P," "Percumyl D," "Perhexyl D," "Perhexa 25B," "Perbutyl C," "Perbutyl D" and "Perhexyne 25B" are preferred.

The amount of organic peroxide included per 100 parts by weight of the total amount of resin components is preferably at least 0.001 part by weight, more preferably at least 0.005 part by weight, and even more preferably at least 0.01 part by weight. The upper limit is preferably not more than 3 parts by weight, more preferably not more than 2.5 parts by weight, and even more preferably not more than 2 parts by weight. If the amount of organic peroxide included is lower than the above range, a sufficient durability may not be obtained. On the other hand, if the amount of organic peroxide included is higher than the above range, peroxide crosslinking between or within ionomer molecules and peroxide crosslinking between or within polyethylene molecules will proceed abruptly with mixing, making it difficult to obtain a uniformly blended state between the ionomer and the polyethylene, which may lead to a decline in the durability of the golf ball.

The organic peroxide serving as component C and the polyethylene serving as component B have a compounding ratio therebetween, expressed as the weight ratio C/B, which, in order to fully achieve the desired effects of the invention, may be in the range of from $0.2 \times 10^{-2}$ to $6.0 \times 10^{-2}$ preferably.

In this invention, the ionomer, polyethylene and organic peroxide may be mixed together at the same time. The conditions used at this time may be set to generally from 150 to 250° C. and from 3 to 15 minutes. The mixing apparatus used for this purpose may be, for example, an internal mixer such as a kneading-type twin-screw extruder, a Banbury mixer or a kneader.

In this case, the method for including various additives other than the above essential ingredients is exemplified by, but not limited to, a method in which the additives are blended together with the above essential ingredients and heating and mixing are carried out at the same time; and a method in which first the essential ingredients are heated and mixed, following which the additives and the like are added and further heating and mixing is carried out.

Optional additives may also be included as appropriate for the intended application in the golf ball composition of the invention. In cases where the above golf ball composition is used as a cover material, in addition to the above-described essential ingredients, additives such as pigments, dispersants, antioxidants, ultraviolet absorbers and light stabilizers may also be included. When such additives are used, they are included in an amount, per 100 parts by weight of the essential ingredients, of preferably at least 0.1 part by weight, and more preferably at least 0.5 part by weight, but preferably not more than 10 parts by weight, and more preferably not more than 4 parts by weight.

The golf ball composition of the invention has a melt flow rate, as measured in accordance with JIS K6760 at a test temperature of 190° C. and a test load of 21N (2.16 kgf), of preferably at least 0.1 g/10 min. At a high melt flow rate, injection molding can be carried out efficiently while yet obtaining an excellent rebound and durability to cracking.

The golf ball composition of the invention has a specific gravity of preferably at least 0.9, more preferably at least 0.92, and even more preferably at least 0.94. The upper limit is preferably not more than 1.3, more preferably not more than 1.2, and even more preferably not more than 1.05.

The Shore D hardness of a molding obtained using the golf ball composition of the invention is preferably at least 40, and more preferably at least 45, but preferably not more than 75, and more preferably not more than 70. If the Shore D hardness is too high, the feel at impact of the golf ball that has been formed may greatly decrease. On the other hand, if the Shore D hardness is too low, the golf ball rebound may decrease.

The golf ball composition of the invention may be used as various pieces (structural components) of a golf ball. In an especially preferred embodiment, the inventive golf ball composition may be used as a cover material or an intermediate layer-forming material in a two-piece solid golf ball composed of a core and a cover encasing the core or in a multi-piece solid golf ball composed of a core of at least one layer, one or more intermediate layer encasing the core and a cover of at least one layer encasing the intermediate layer.

As described above, the golf ball composition of the invention is a golf ball composition which is composed primarily of an ionomer resin and which increases resilience and durability.

EXAMPLES

Working Examples of the invention and Comparative Examples are given below by way of illustration, and not by way of limitation.

Examples 1 to 8

Comparative Examples 1 to 6

Solid cores were produced by preparing a core composition having the formulation shown in Table 1 below, both for the Examples of the invention and for the Comparative Examples, then molding and vulcanizing the composition at 155° C. for 15 minutes.

TABLE 1

| Compounding ingredients | Trade names | Parts by weight |
|---|---|---|
| cis-1,4 Polybutadiene | "BR01," a synthetic rubber from JSR Corporation | 100 |
| Zinc oxide | zinc oxide from Sakai Chemical Co., Ltd. | 4 |
| Barium sulfate | precipitated barium sulfate from Sakai Chemical Co., Ltd. | 19.6 |
| Antioxidant | a rubber antioxidant from Ouchi Shinko Chemical Industry Co., Ltd. | 0.1 |
| Zinc salt of pentachlorothiophenol | | 0.8 |
| Zinc diacrylate | from Nippon Shokubai Co., Ltd. | 27.5 |
| Dicumyl peroxide | an organic peroxide from NOF Corporation | 0.6 |
| 1,1-Bis(t-butylperoxy)-cyclohexane | an organic peroxide from NOF Corporation | 0.6 |

Preparation of Cover Composition and Formation of Cover

The cover composition was obtained by using a kneading-type twin-screw extruder to mix together at the same time the ingredients shown in Table 2 (i.e., the ionomers, polyethylene and organic peroxide), thereby producing a resin composition (in the form of pellets). Next, using resin pellets of the composition shown in Table 2, a cover was injection-molded over the core produced as described above, thereby giving a solid golf ball with a two-layer construction composed of a core encased by a cover. During injection-molding of the cover, dimples in a common and predetermined pattern were formed on the surface of the cover in each of the Working Examples of the invention and the Comparative Examples.

The above trade names are explained below.

Himilan 1557, Himilan 1601, Himilan 1605, Himilan 1706: Ionomers available from DuPont-Mitsui Polychemicals Co., Ltd.

Nucrel AN4319: Available from DuPont-Mitsui Polychemicals Co., Ltd.

Polyethylene J1019: A high-pressure, low-density polyethylene (melt flow rate: 10 g/10 min, JIS-K6760) available from Ube-Maruzen Polyethylene Dicumyl peroxide: Available as "Percumyl D" from NOF Corporation Titanium oxide: Available as "Tipaque R550" from Ishihara Sangyo Kaisha, Ltd.

The properties of the balls obtained in all of the Examples of the invention and the Comparative Examples were evaluated by the methods described below. The results are shown in Table 3 (Examples of the invention) and Table 4 (Comparative Examples).

Compressive Deformation (Deflection)

At a temperature of 23.9±1° C., the object to be tested (either a core or a golf ball) was placed on a steel plate, and the deflection (mm) by the object when compressed under a final load of 1,275 N (130 kgf) from an initial load of 98 N (10 kgf) was measured.

Initial Velocity

The initial velocity of the ball was measured using an initial velocity measuring apparatus of the same type as the USGA drum rotation-type initial velocity instrument approved by the R&A. The ball was held isothermally at a temperature of 23.9±1° C. for at least 3 hours, then measured at the same temperature. The ball was hit using a 250-pound (113.4 kg) head (striking mass) at an impact velocity of 143.8 ft/s (43.83 m/s). Ten balls were hit two times each and the time taken for the ball to traverse a distance of 6.28 ft (1.91 m) was measured, based on which the initial velocity (m/s) of the ball was calculated. This cycle was carried out over a period of about 15 minutes.

Durability to Cracking

The ball durability was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s. The number of shots required for the golf ball to crack was measured.

TABLE 2

| Cover formulation (pbw) | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 |
|---|---|---|---|---|---|---|---|---|---|---|---|---|---|---|---|
| Himilan 1557 | 47.5 | 45 | 45 | | 38.25 | | 40 | 40 | 50 | 40 | 30 | 35 | 30 | | 45 |
| Himilan 1601 | 47.5 | 45 | 45 | | 38.25 | | 40 | 40 | 50 | 40 | 30 | 35 | 30 | | 45 |
| Himilan 1605 | | | | 45 | | 38.25 | | | | | | | | 50 | |
| Himilan 1706 | | | | 45 | | 38.25 | | | | | | | | 50 | |
| Nucrel AN4319 | | | | | 13.5 | 13.5 | | | | | | | | | |
| Polyethylene J1019 | 5 | 10 | 10 | 10 | 10 | 10 | 20 | 20 | 0 | 20 | 40 | 30 | 40 | 0 | 10 |
| Dicumyl peroxide | 0.05 | 0.05 | 0.1 | 0.05 | 0.05 | 0.05 | 0.05 | 0.1 | 0 | 0 | 0 | 0.05 | 0.05 | 0 | 4 |
| Titanium oxide | 3.78 | 3.78 | 3.78 | 3.78 | 3.78 | 3.78 | 3.78 | 3.78 | 3.78 | 3.78 | 3.78 | 3.78 | 3.78 | 3.78 | 3.78 |
| Specific gravity | 0.97 | 0.97 | 0.97 | 0.99 | 0.97 | 0.97 | 0.97 | 0.97 | 0.97 | 0.97 | 0.96 | 0.97 | 0.97 | 0.99 | could not be mixed |
| Material hardness (Shore D, ASTM D-2240) | 62.9 | 62.4 | 62.4 | 65 | 54 | 56.6 | 60.2 | 60.5 | 63.4 | 60.5 | 58.6 | 59.5 | 58.5 | 65 | |
| Melt flow rate (g/10 min) | 0.2 | 0.4 | 0.12 | 0.3 | 3.4 | 3.3 | 0.2 | 0.9 | 2.2 | 3.3 | 5.1 | 1 | 1.7 | 2.1 | |
| Weight ratio of component C to component B (C/B) | $1.0 \times 10^{-2}$ | $0.5 \times 10^{-2}$ | $1.0 \times 10^{-2}$ | $0.5 \times 10^{-2}$ | $0.5 \times 10^{-2}$ | $0.5 \times 10^{-2}$ | $0.5 \times 10^{-2}$ | $0.25 \times 10^{-2}$ | — | 0 | 0 | $0.17 \times 10^{-2}$ | $0.13 \times 10^{-2}$ | — | $40.0 \times 10^{-2}$ |

TABLE 3

|  |  | Example | | | | | | | |
| --- | --- | --- | --- | --- | --- | --- | --- | --- | --- |
|  |  | 1 | 2 | 3 | 4 | 5 | 6 | 7 | 8 |
| Core | Diameter (mm) | 38.6 | 38.6 | 38.6 | 38.6 | 38.6 | 38.6 | 38.6 | 38.6 |
|  | Weight (g) | 35.45 | 35.45 | 35.45 | 35.45 | 35.45 | 35.45 | 35.45 | 35.45 |
|  | Compressive deformation (mm) | 4.0 | 4.0 | 4.0 | 4.0 | 4.0 | 4.0 | 4.0 | 4.0 |
|  | Initial velocity (m/s) | 77.1 | 77.1 | 77.1 | 77.1 | 77.1 | 77.1 | 77.1 | 77.1 |
| Cover | Type of formulation | No. 1 | No. 2 | No. 3 | No. 4 | No. 5 | No. 6 | No. 7 | No. 8 |
|  | Thickness (mm) | 2.1 | 2.1 | 2.1 | 2.1 | 2.1 | 2.1 | 2.1 | 2.1 |
| Ball properties | Diameter (mm) | 42.7 | 42.7 | 42.7 | 42.7 | 42.7 | 42.7 | 42.7 | 42.7 |
|  | Weight (g) | 45.2 | 45.2 | 45.2 | 45.2 | 45.2 | 45.2 | 45.2 | 45.2 |
|  | Compressive deformation (mm) | 3.3 | 3.3 | 3.3 | 3.1 | 3.3 | 3.2 | 3.3 | 3.3 |
|  | Initial velocity (m/s) | 77.1 | 77.0 | 77.0 | 77.7 | 77.1 | 77.6 | 76.6 | 76.7 |
|  | Durability (shots) | 245 | 251.8 | 260 | 223.8 | 289.2 | 261.2 | 162 | 171 |

TABLE 4

|  |  | Comparative Example | | | | | |
| --- | --- | --- | --- | --- | --- | --- | --- |
|  |  | 1 | 2 | 3 | 4 | 5 | 6 |
| Core | Diameter (mm) | 38.6 | 38.6 | 38.6 | 38.6 | 38.6 | 38.6 |
|  | Weight (g) | 35.45 | 35.45 | 35.45 | 35.45 | 35.45 | 35.45 |
|  | Compressive deformation (mm) | 4.0 | 4.0 | 4.0 | 4.0 | 4.0 | 4.0 |
|  | Initial velocity (m/s) | 77.1 | 77.1 | 77.1 | 77.1 | 77.1 | 77.1 |
| Cover | Type of formulation | No. 9 | No. 10 | No. 11 | No. 12 | No. 13 | No. 14 |
|  | Thickness (mm) | 2.1 | 2.1 | 2.1 | 2.1 | 2.1 | 2.1 |
| Ball properties | Diameter (mm) | 42.7 | 42.7 | 42.6 | 42.7 | 42.7 | 42.6 |
|  | Weight (g) | 45.3 | 45.2 | 45.0 | 45.1 | 45.1 | 45.3 |
|  | Compressive deformation (mm) | 3.3 | 3.4 | 3.4 | 3.4 | 3.4 | 3.1 |
|  | Initial velocity (m/s) | 77.2 | 76.7 | 76.2 | 76.4 | 76.2 | 77.7 |
|  | Durability (shots) | 145 | 55 | 3 | 31 | 10 | 117 |

The invention claimed is:

1. A golf ball composition comprising a resin composition which is comprised of:
   (A) one or more acid-containing polymers selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer;
   (B) a polyethylene; and
   (C) an organic peroxide,
   wherein component B has a melt flow rate, as measured in accordance with JIS K6760 at a test temperature of 190° C. and a test load of 21 N (2.16 kgf), of at least 5 g/10 min;
   component A and component B have a compounding ratio therebetween, expressed as the weight ratio A/B, of between 95/5 and 50/50; component C is included in an amount, per 100 parts by weight of the total amount of resin components, of at least 0.001 part by weight and not more than 3 parts by weight; and component B and component C have a compounding ratio therebetween, expressed as the weight ratio C/B, in the range of from $0.2 \times 10^{-2}$ to $6.0 \times 10^{-2}$, and wherein the Shore D hardness of a molded material of the golf ball composition is from 45 to 70.

2. The golf ball composition of claim 1, wherein component C has a one-minute half life temperature of at least 140° C.

3. The golf ball composition of claim 1, wherein the metal neutralization product of component A in the ionomer resin composition contains cations which come from a cation source selected from the group consisting of zinc compounds, sodium compounds and magnesium compounds.

4. The golf ball composition of claim 1 which has a melt flow rate, as measured in accordance with JIS K6760 at a test temperature of 190° C. and a test load of 21 N (2.16 kgf), of at least 0.1 g/10 min.

5. A golf ball obtained by using a molding of the golf ball material of claim 1 as a structural component of the ball.

6. A golf ball obtained by using the golf ball material of claim 1 as a cover material or an intermediate layer material in a two-piece solid golf ball having a core and a cover encasing the core, or in a multi-piece solid golf ball having a core of at least one layer, at least one intermediate layer encasing the core and a cover of at least one layer encasing the intermediate layer.

7. The golf ball composition of claim 1, wherein component A consists of the combination of component (A1) and component (A2), the component (A1) being an olefin-unsaturated carboxylic acid random copolymer and/or an olefin-unsaturated carboxylic acid-unsaturated carboxylic acid ester random copolymer, and the component (A2) being a metal ion neutralization product of an olefin-unsaturated carboxylic acid random copolymer and/or a metal ion neutralization product of an olefin-unsaturated carboxylic acid-unsaturated carboxylic acid ester random copolymer.

8. The golf ball composition of claim 1, wherein the Shore D hardness of the molded material is from 54 to 65.

9. The golf ball composition of claim 1, wherein the polyethylene of component B has a Shore D material hardness in the range of 40 to 60.

10. The golf ball composition of claim 1, wherein the polyethylene of component B is a high-pressure low-density polyethylene.

11. A golf ball composition comprising a resin composition which is comprised of:
- (A) one or more acid-containing polymers selected from the group consisting of an olefin-unsaturated carboxylic acid random copolymer and/or an olefin-unsaturated carboxylic acid-unsaturated carboxylic acid ester random copolymer, and a metal ion neutralization product of an olefin-unsaturated carboxylic acid random copolymer and/or a metal ion neutralization product of an olefin-unsaturated carboxylic acid-unsaturated carboxylic acid ester random copolymer;
- (B) a high-pressure low-density polyethylene; and
- (C) an organic peroxide,
- wherein component B has a melt flow rate, as measured in accordance with JIS K6760 at a test temperature of 190° C. and a test load of 21 N (2.16 kgf), of at least 5 g/10 min; component A and component B have a compounding ratio therebetween, expressed as the weight ratio A/B, of between 95/5 and 50/50; component C is included in an amount, per 100 parts by weight of the total amount of resin components, of at least 0.001 part by weight and not more than 3 parts by weight; and component B and component C have a compounding ratio therebetween, expressed as the weight ratio C/B, in the range of from $0.2 \times 10^{-2}$ to $6.0 \times 10^{-2}$, and wherein the resin components consist of component A and component B.

* * * * *